(12) United States Patent
Lo et al.

(10) Patent No.: US 6,240,072 B1
(45) Date of Patent: May 29, 2001

(54) PIECEWISE COHERENT BEAMFORMING FOR SATELLITE COMMUNICATIONS

(75) Inventors: Wing Lo; Jue Chang, both of Plano, TX (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/055,622

(22) Filed: Apr. 6, 1998

Related U.S. Application Data

(60) Provisional application No. 60/042,796, filed on Apr. 7, 1997.

(51) Int. Cl.[7] .................................................. H04B 7/204
(52) U.S. Cl. ......................... 370/316; 455/13.1; 455/13.3
(58) Field of Search .................................. 320/310, 315, 320/316, 319, 327; 455/11.1, 12.1, 13.1, 13.2, 13.3, 13.4

(56) References Cited

U.S. PATENT DOCUMENTS

| | | |
|---|---|---|
| 4,879,711 | 11/1989 | Rosen . |
| 4,896,369 * | 1/1990 | Adams, Jr. et al. ................. 455/13.4 |
| 5,115,248 | 5/1992 | Roederer . |
| 5,572,216 | 11/1996 | Weinberg et al. . |
| 5,717,686 * | 2/1998 | Schiavoni ............................. 370/321 |
| 5,875,182 * | 2/1999 | Hatzipapafotiou ................... 370/321 |
| 5,907,541 * | 5/1999 | Fairholm et al. .................... 370/316 |
| 5,915,207 * | 6/1999 | Dao et al. .............................. 455/9 |
| 6,014,372 * | 1/2000 | Kent et al. ........................... 370/316 |

\* cited by examiner

*Primary Examiner*—Ajit Patel
*Assistant Examiner*—Bob A. Phunkulh
(74) *Attorney, Agent, or Firm*—John D. Crane

(57) ABSTRACT

The satellite communication system uses defocused feed arrays to generate a large number of beams that cover a number of regions. The ground gateways are assigned the same frequency spectrum. The beams are divided into multiple groups and each group is controlled by a different ground gateway. The signals within each group are coherent. Each gateway can then control the set of beams landing on its neighboring territory.

6 Claims, 10 Drawing Sheets

○ BEAMS CONTROLLED BY GATEWAY X
  WITH FREQUENCY RANGE X

○ BEAMS CONTROLLED BY GATEWAY Y
  WITH FREQUENCY RANGE Y

----- FEEDER LINKS

----- SATELLITE-TO-TERMINAL LINKS

700 — ⊘ FEEDS IN FEED GROUP FGx; SIGNALS FED BY GATEWAY X

702 — ⊘ FEEDS IN FEED GROUP FGy; SIGNALS FED BY GATEWAY Y

704 — ⊗ FEEDS THAT BELONG BOTH GATEWAY X AND Y; SIGNALS RADIATED FROM THESE FEEDS ARE THE LINEAR SUMMATION OF SIGNALS FROM BOTH GATEWAYS

○ FEEDS FED BY OTHER GATEWAYS

— FEEDER LINKS
— SATELLITE-TO-TERMINAL LINKS

PIECEWISE COHERENT BEAMFORMING FOR SATELLITE COMMUNICATIONS

RELATED APPLICATIONS

This is a 35 U.S.C. §111(a) application of provisional U.S. patent application Ser. No. 60/042,796, filed Apr. 7, 1997.

BACKGROUND OF THE INVENTION

I. Field of the Invention

The present invention relates generally to satellite communication systems. More particularly, the present invention relates to a ground based beamforming system designed to provide flexible frequency and beam allocation.

II. Description of the Related Art

Fundamentals of Analog Beamforming

The term beamforming relates to the function performed by a device in which energy radiated by an aperture antenna is focused along a specific direction in space. The objective is either preferentially receiving a signal from a particular direction or preferentially transmitting a signal in a particular direction.

For example, in a parabolic antenna system, the dish is the beamforming network since it takes the energy that lies within the aperture formed by the perimeter of the dish and focuses it onto the antenna feed. The dish and feed operate as a spatial integrator.

Energy from a far-field source, which is assumed to be aligned with the antenna's preferred direction, arrives at the feed temporarily aligned and is summed coherently. In general, sources in other directions arrive at the feed unaligned and are added incoherently. For this reason, beamforming is often referred to as spatial filtering.

Beamforming may also be carried out using phased-array antennas. An array can be considered as a sampled aperture. When an array is illuminated by a source, samples of the source's wavefront are recorded at the location of the antenna elements.

The outputs from antenna elements may be subjected to various forms of signal processing. In these cases, phase or amplitude adjustments are made to produce outputs that provide concurrent angular information for signals arriving from several different directions in space. When the outputs of the elements of an array are combined via some passive phasing network, the phasing will usually arrange for the output of all the elements to add coherently for a given direction. If information were desired regarding signals arriving from a different region in space, another phasing network would have to be implemented.

The network that controls the phases and amplitudes of the excitation current is typically called the beamforming network. If beamforming is carried out at a radio frequency (RF), the analog beamforming network typically consists of devices such as phase shifters and power dividers that adjust the amplitudes and phases of the elemental signals to form a desired beam. The beamforming network can be implemented using microwave lenses, waveguides, transmission lines, printed microwave circuits, and hybrids.

It is sometimes desirable to form multiple beams that are offset by finite angles from each other. The design of a multiple-beam beamforming network, known as a beam-forming matrix, is much more complicated than that of a single-beam, beamforming network. In a beamforming matrix, an array of hybrid junctions and fixed-phase shifters are used to achieve desired results.

Fundamentals of Digital Beamforming

Beamforming functions can be achieved in the digital domain, especially when the original signal is in digital form (e.g., signals from a digital radio). Digital Beamforming is a combination of antenna technology and digital technology. A generic, digital beamforming antenna system is comprised of three major components: an antenna array, a digital transceiver, and a digital signal processor (DSP).

In a digital beamforming antenna system, the received signals are digitized at the element level. Digital beamforming is based on capturing the radio frequency (RF) signals at each of the antenna elements and converting them into two streams of binary baseband signals known as the in-phase (I) and quadrature-phase (Q) channels.

Included within the digital baseband signals are the amplitudes and phases of signals received at each element of the array. The beamforming is accomplished by weighting these digital signals, thereby adjusting their amplitudes and phases, such that when added together they form the desired beam. This function, usually performed using an analog beamforming network, can be done by a special purpose DSP.

The key to this technology is that the receivers must all be closely matched in amplitude and phase. A calibration process that adjusts the values of the data stream prior to beamforming accomplishes the matching.

One advantage of digital beamforming over conventional phased arrays is the greatly added flexibility without any attendant degradation in the signal-to-noise ratio (SNR). Additional advantages include:

1. Beams can be assigned to individual users, thereby assuring that all links operate with maximum gain;
2. Adaptive beamforming can be easily implemented to improve the system capacity by suppressing co-channel interference and can be used to enhance system immunity to multipath fading;
3. Digital beamforming systems are capable of performing, in the digital domain, real-time calibration of the antenna system. Thus, variations in amplitude and phase between transceivers can be corrected in real time; and
4. Digital beamforming has the potential for providing a major advantage when used in satellite communications. If, after the launch of a satellite, it is found that the satellite's capabilities or performance of the beamformer needs to be upgraded, a new suite of software can be telemetered to the satellite. Digital beamforming allows both the direction and shape to be changed by changing the coefficients in the multiplications performed by the digital signal processor. Analog beamforming has both fixed by hardware component values that are not easily changed.

Digital Beamforming in Satellite Communications

In microwave communication systems, such as those used in communication satellites, networks generate antenna beam signals. These antenna beam signals are then used to drive transmit arrays that in turn form the transmit beams that send communication signals to the intended destination.

Beamforming techniques were introduced to generate electronically steerable and reconfigurable beams. Electronic antenna steering negated many of the disadvantages of mechanical steering in which an antenna was moved mechanically by either rotating itself or the entire satellite at a slow rate. This method only allowed users in a small area to be concurrently served.

Electronic antenna steering, however, provides the ability to focus on many larger areas concurrently with high gain. By controlling the phase and amplitude of the transmit signals fed onto the components of the transmit (feeder) array, the beam direction, shape, sidelobe characteristics, and the Effective Isotropic Radiation Power (EIRP), can be manipulated to the requirement of a particular application. The EIRP, as is well known in the art, is the product of the input power to the antenna and its maximum gain.

Early types of beamforming networks were comprised of a single periodic delay line and only a single beam was formed at a time. Thus, long physical lines were needed to achieve a proper delay condition.

Newer types of beamforming applications employ resonant circuit delay networks to achieve frequency addressability of antenna beams. In the digital domain, the beamforming network is translated into a complex-valued beamforming matrix.

Beamforming can be performed either on the ground or on the satellite. There are several advantages with having beamforming performed on the ground. First, a ground beamforming system releases some satellite load while allowing more beamformers to be placed on the ground than could be placed in a satellite. Second, a beamformer on the ground provides more flexibility for future tuning and modification if a failure or error occurs. Finally, the number of ground-based beamformers can be increased if the need arises. This option is not available if the satellite has already been launched.

The capacity of a satellite system is dependent on the number of times the allocated frequency spectrum can be reused. Polarization and spatial isolation of beams have been used to increase frequency reuse. A problem that arises as the number of isolated beams is increased, however, is that analog BFN becomes too difficult to implement. Because of this fact, the practical number of times the frequency can be reused may be limited.

Recent satellite communications systems that use beamforming techniques to improve the communication capacity through the reuse of the assigned frequency spectrum over multiple, contiguous zones may be implemented in accordance with the frequency reuse system disclosed in U.S. Pat. No. 4,879,711, incorporated herein by reference. The multi-feed, multi-beam feeder system implementation disclosed in U.S. Pat. No. 5,115,248, incorporated herein by reference.

FIG. 1 is a diagram of a prior art, multi-beamforming, satellite communication network. In FIG. 1, ground gateway station (100) sends a combined voice and data signal (102), usually in a bandwidth of 10 MHz, via the RF feeder link to the satellite (106). This signal is received by a multibeam antenna on the satellite and then transmitted to the cells within the footprint via the RF terminal links (108, 112, and 114). The part of the signal that corresponds to a particular beam is routed to that beam. Each beam corresponds to a specific frequency range that depends on the total bandwidth, channel bandwidth, and reuse factors.

FIG. 3 illustrates a block diagram of a system using ground-based beamforming. The beamforming network can be implemented by either analog or digital circuits. A digital implementation requires additional analog-to-digital, digital-to-analog, and digital signal processing modules in the beamforming network block.

In the ground based beamforming network (300), multiple ground radio transmitters (302–304) send beam signals to the beamforming network 306 that are designated to particular beams. The beamforming network (306) manipulates these beam signals into feed RF signals (308) that are carried over to the multiplexer (310). The multiplexer combines the multiple feed input to a single information stream.

This information stream is input to a feeder RF front-end (312). The feeder RF front-end (312) converts the signals to the proper RF frequency and power for transmission by the ground based feeder link antenna (314).

The signals are transmitted from the ground based beamforming network (300) to the space segment (320) over the feeder link (316). The space-based feed link antenna (318) receives the multiplexed signal.

The receiver RF front-end band-pass filters the antenna signal and preamplifies the signal using low noise amplifiers to a required signal strength. The signals from the RF front-end (325) are input to the demultiplexer (335). The demultiplexer (335) breaks out the individual feed signals that were multiplexed during the ground processing for transmission via the feeder link. Each feed signal is input to the frequency conversion section (340) where each signal is converted with a common local oscillator signal. The resulting frequency converted signals are input to the multi-beam/multi-feed antenna array (350) for transmission to the earth.

Signals radiated from multiple feeds will form beams pointing to different directions based upon the phase relationship between coherent signals at the phased array. These beams are directed to cover the service area on earth through a frequency reuse plan.

Multiple ground gateway stations are used to provide connectivity from the satellite network to the ground communications network. This eliminates the single point of failure and provides a local landing point to reduce use of long distance ground transmission facilities.

In the case of the multi-feed/multi-beam beamforming systems, it is well known in the art that all signals go to antenna feeds that form a common set of beams that must be coherent. In other words, those feed signals must be beamformed from the same ground gateway station. This places a restriction on the beamforming system that all the beams formed for one particular frequency band must come from a single ground gateway.

The resulting beamforming systems are such that the traffic coming from any one particular gateway are evenly distributed to all the beams of that frequency. FIG. 4 illustrates a block diagram for such a system design. A ground station controls the frequency band, from frequency 1 to frequency k, that is to be used in the spot beam links where any signals on one frequency will pass through the same beamforming network before being distributed to all the feeds. A coherent multiplexer is used to ensure the coherence of the feed signals against possible phase distortion during transmission.

Referring to FIG. 4, different frequencies are processed by different ground based beamforming networks. In the ground based network, frequency 1 (402) represents a particular frequency range of the entire frequency spectrum that is to be processed by the baseband beamforming network (408).

The digital radio signals (404) that were sent over the range of frequencies in channel 1 (402) are in baseband form and are sent as beam signals (406) to designated ports of the baseband beamforming network (408). The baseband beamforming network (408) converts these beam signals into feed signals (410) that are routed to the coherent multiplexer (412). The coherent multiplexer (412) combines all of the input feed signals into one information stream.

The information stream is input to an RF modulator (414) for modulation to the frequency 1 through k range for transmission. Each modulated signal is summed (416) before being input to the feeder RF front-end module (420). The feeder RF front-end module (420) up-converts the RF and provides the required power amplification for transmission of the summed signal.

FIG. 5 shows the prior art beam coverage using the multi-frequency, multi-beam beamforming networks shown in FIG. 4. It is clear in this figure that the frequency bands controlled by gateway X (500) in one country control beams over entire satellite footprint (502) uniformly. Similarly, the frequency bands controlled by gateway Y (504) in another country also control the beams over the entire satellite footprint (506) uniformly.

The footprints generated from the beams that are controlled by gateway X (500) and gateway Y (504) cover the same geographic area but provide coverage over two different RF channel layers. The corresponding capacity pattern does not match the traffic pattern very well.

Although this is one method for utilizing beamforming networks, the capacity distribution does not match the general traffic model in which traffic originating from any particular gateway mostly terminates in the nearby regions. This method implies that one gateway controls all the beams of a specific group of RF frequencies (channels) over the entire satellite footprint and that a large portion of the traffic will have to be transmitted to distant gateways through the ground facilities to match the capacity distribution. This would incur long distance charges.

In a regional system where a single communication satellite serves several countries, there exists a need to confine most communications traffic to within the boundary of a country. What is needed, therefore, is a beamforming system that can control the set of beams landing on a neighboring territory to better serve the traffic pattern of subscribers and the services they will use.

SUMMARY

The present invention encompasses a satellite communications system comprising a plurality of regional ground-based gateway stations. Each gateway station controls some range of frequency spectrum that can overlap substantially with the same frequency spectrum controlled by other gateway stations.

Each gateway station has a plurality of digital radios operating in the same frequency spectrum as the radio signals of each of the other gateway stations. A baseband beamforming network is coupled to a group of radio signals. Each beamforming network generates a group of feedgroup signals.

A coherent multiplexer is coupled to each baseband beamforming network. The coherent multiplexers combine the group of feedgroup signals from each beamforming network into a single baseband signal.

A linear, radio frequency modulator is coupled to each coherent multiplexer. Each modulator generates a radio frequency modulated signal in response to each of the baseband signals from the multiplexer.

The modulated signals from all of the station's linear modulators are summed and input to a feeder RF front-end module. The feeder RF front-end module up-converts the RF to the feeder link band and adjusts the signal power to the proper level for transmission to a satellite.

The present invention enables beams of the same frequency to be divided into multiple groups where each group is controlled by a different ground-based gateway station. Each gateway station can then control the set of beams landing on its neighboring regions. The present invention, therefore, provides a new way to better fit the satellite resources to the traffic patterns of a regional satellite system serving multiple countries.

DETAILED DESCRIPTION OF THE PREFERRED EMBODIMENT

The present invention provides a system and process for beam allocation in a satellite communication system. The present invention provides a system with the flexibility of gateways to beams association such that all the beams falling within a country are controlled by a gateway within the same country. Similar frequency beams being processed and controlled by different ground gateway stations accomplish this.

Figure 1:
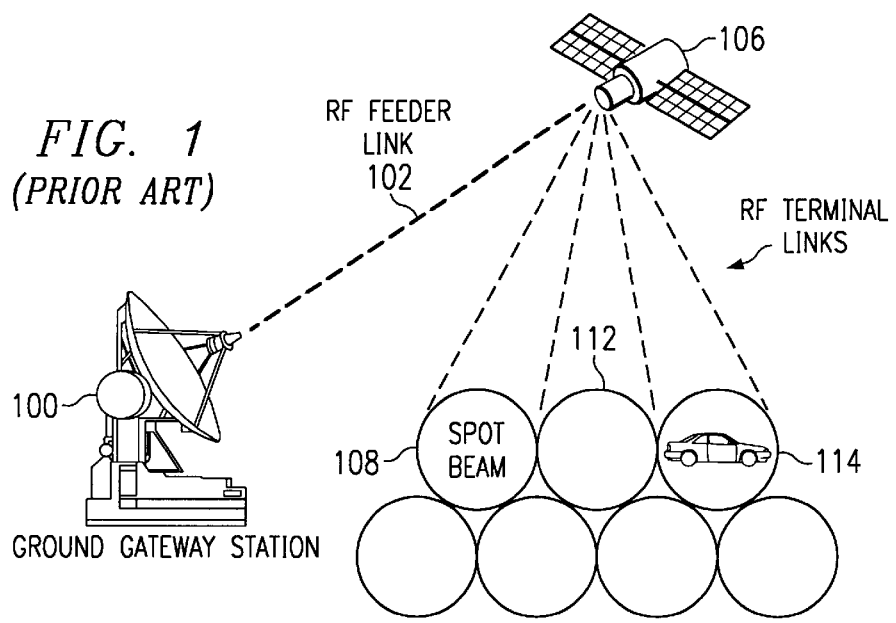
FIG. 1 is a prior art diagram for a multi-beam communication satellite network.
Figure 2:
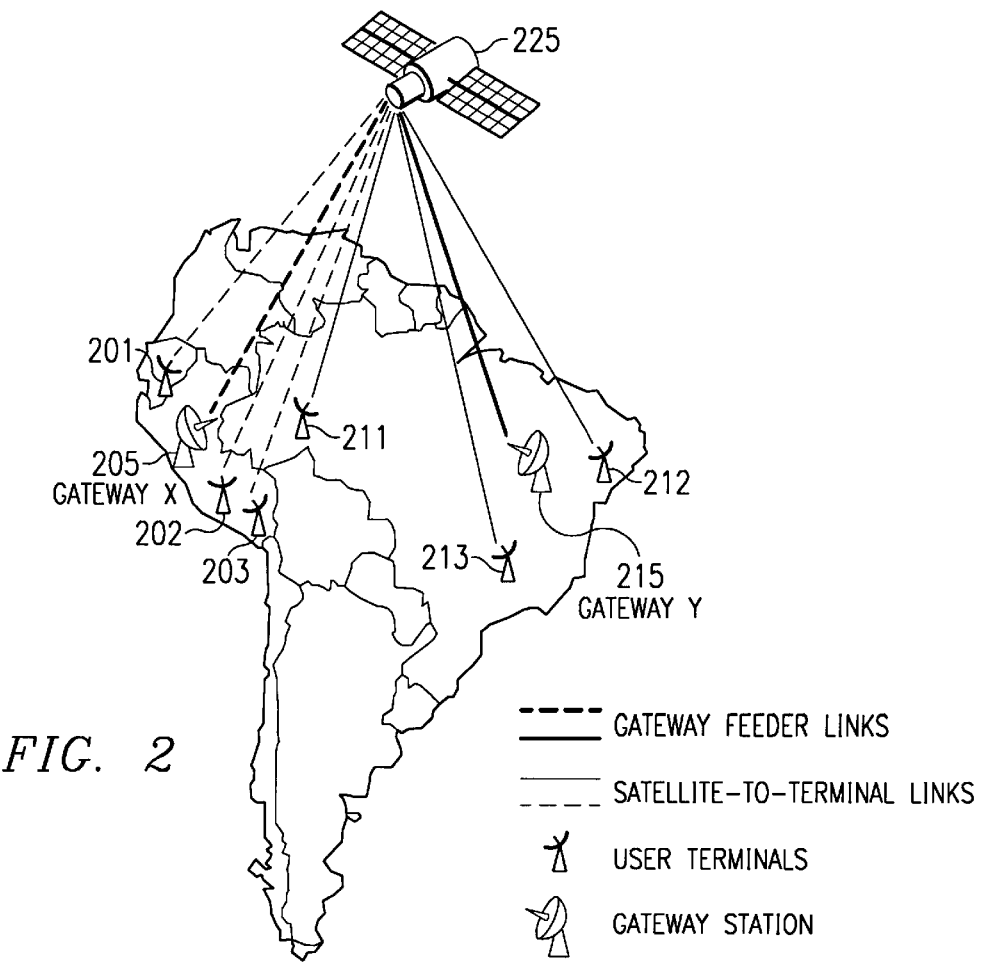
FIG. 2 shows a general communications traffic pattern between terminals and a gateway station where traffic originated from a particular gateway mostly terminates in a nearby region.
Figure 3:
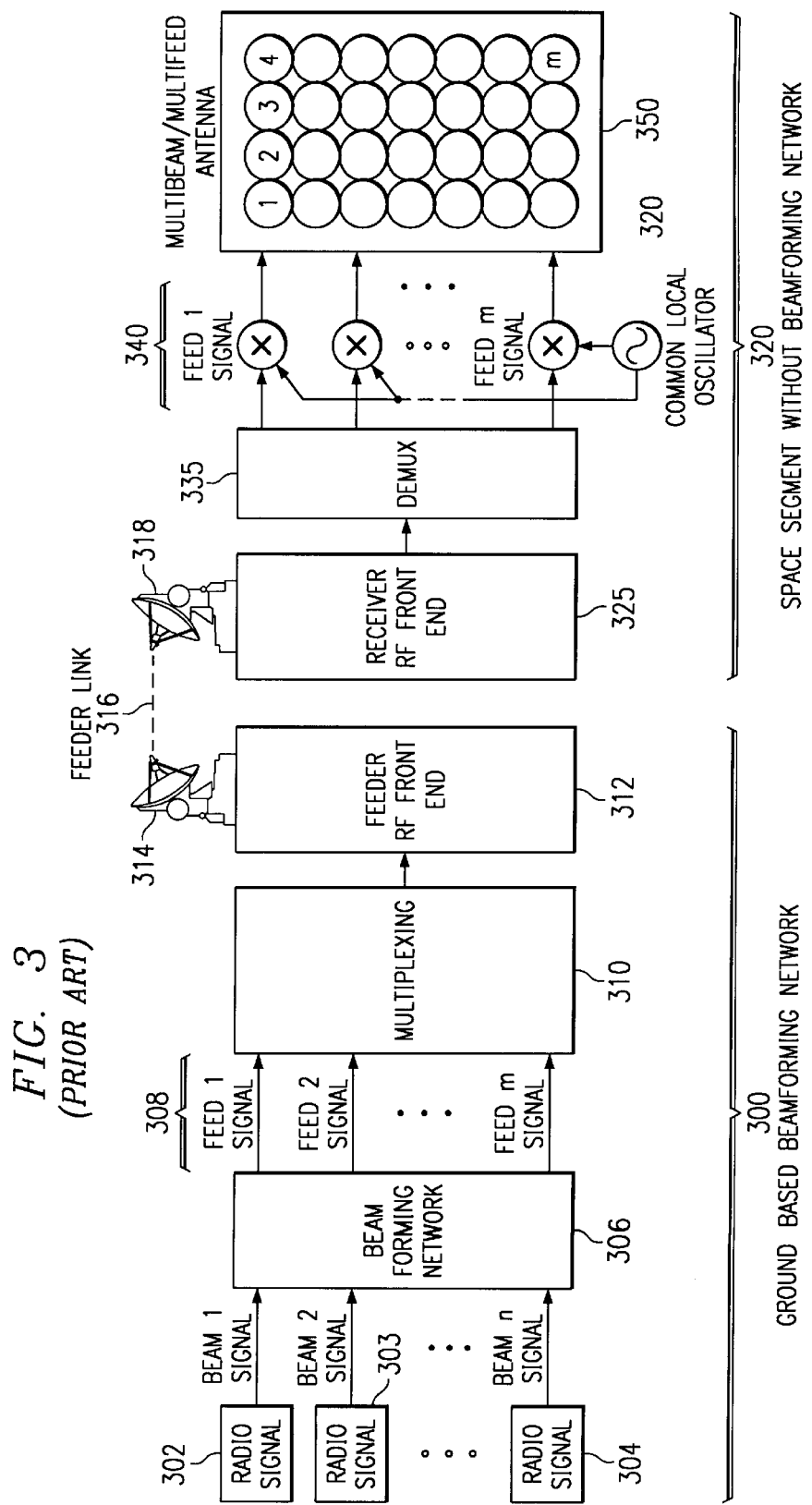
FIG. 3 is a prior art high-level block diagram of a ground-based beamforming system.
Figure 4:
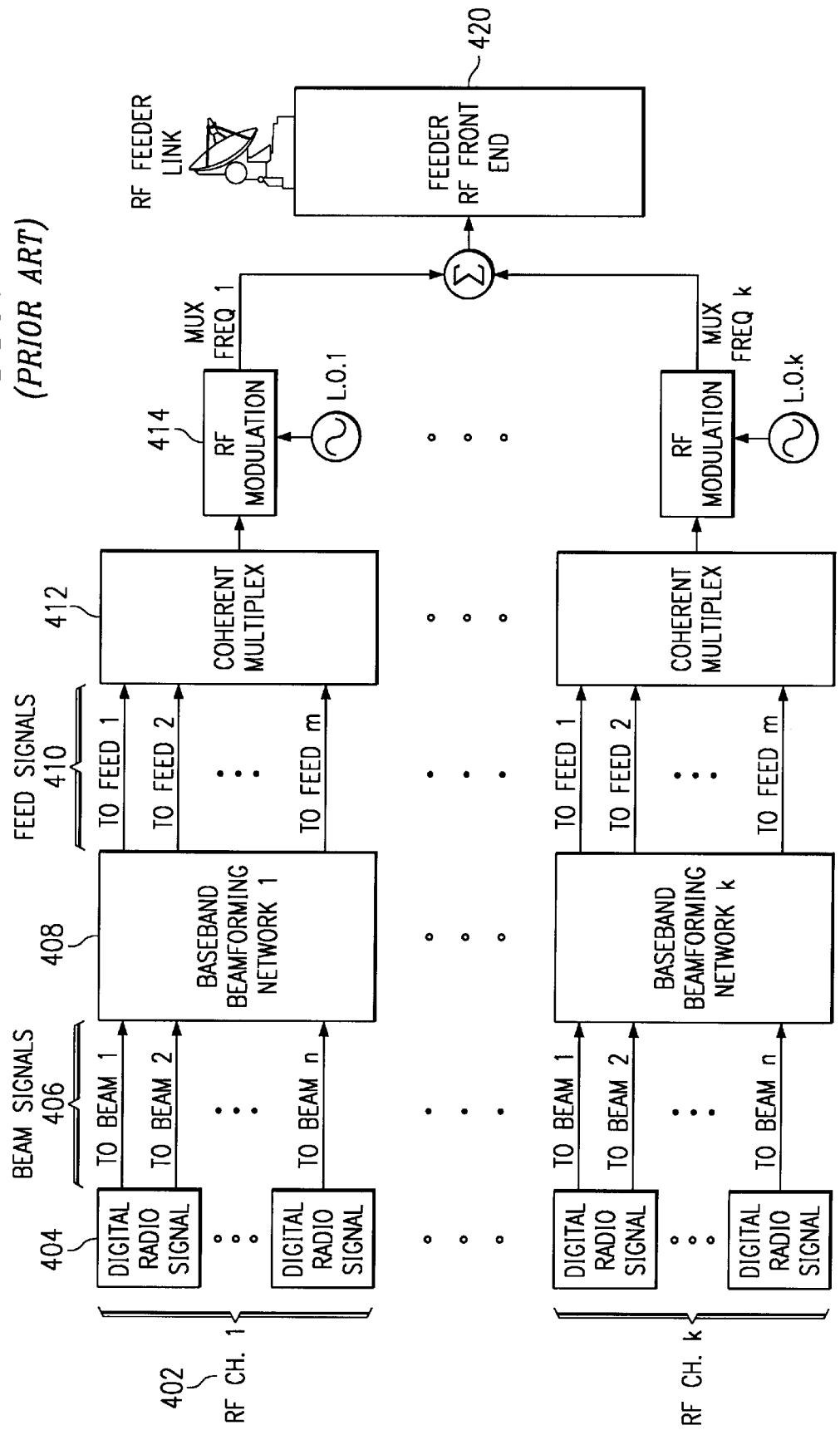
FIG. 4 is a prior art block diagram for the functional structure of a multi-frequency, multi-beam beamforming network in which a gateway controls all the beams of the RF channels over the entire satellite footprint.

FIG. 2 shows the general communications traffic pattern between terminals and a gateway station where traffic originated from a particular gateway or terminal generally terminates in a nearby region. In this case, the traffic from terminals (201–203) in one country tends to be confined in the same region. Additionally, the traffic from the terminals (211–213) in another country tends to be confined to that country.

The gateways (205 and 215) operate the same way. Gateway X (205) mainly handles the traffic from its own country (e.g., from terminals (201–203). The same is true for gateway Y (215). In both the terminal and gateway instances, the signals can occur in opposite directions.

Figure 6:
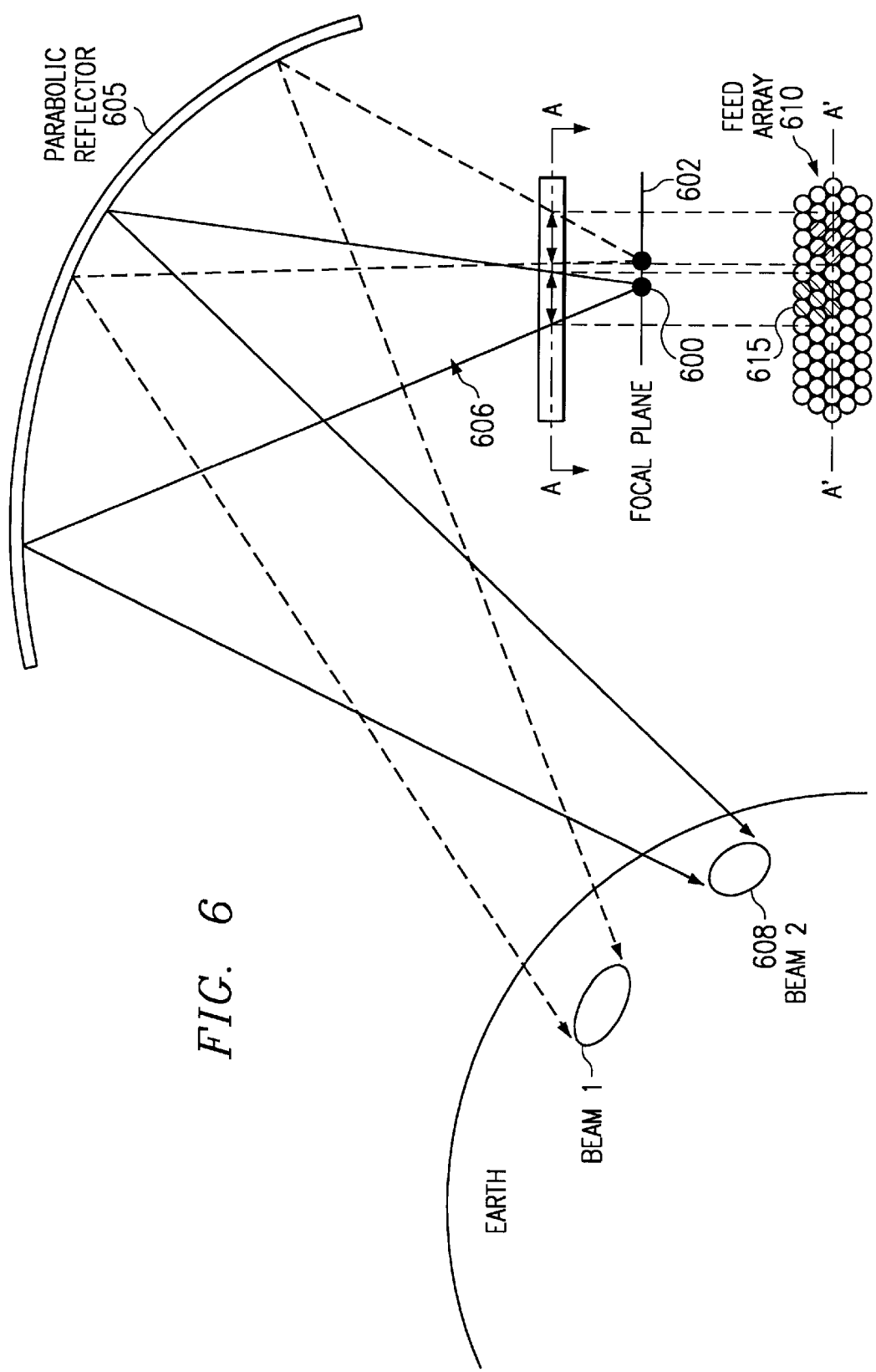
FIG. 6 shows a way of using groups of feeds to form beams where the feed array is defocused.

FIG. 6 illustrates the concept of the present invention. Using one source element (600) on the focal plane (602) of the parabolic antenna (605) illuminates one large section of the Earth. By moving the feed array (610) slightly off of the focal plane (602), a greater number of elements can be used to illuminate selective regions of the Earth.

FIG. 6 shows a group of seven feeds (615) in a defocused feed array (610) forming one beam (606). The beam (606)

is generated when the group of feeds (615) are excited simultaneously and are reflected off of the parabolic reflector (605) to a beam coverage area (608) (or footprint) on the earth.

The parabolic reflector (605) and the feed array (610) are located on a portion of the satellite antenna (not shown). The group of feeds (615) are located slightly off the focal plane (602) and are equivalent to their focal point (600) on the focal plane (602).

Figure 5:
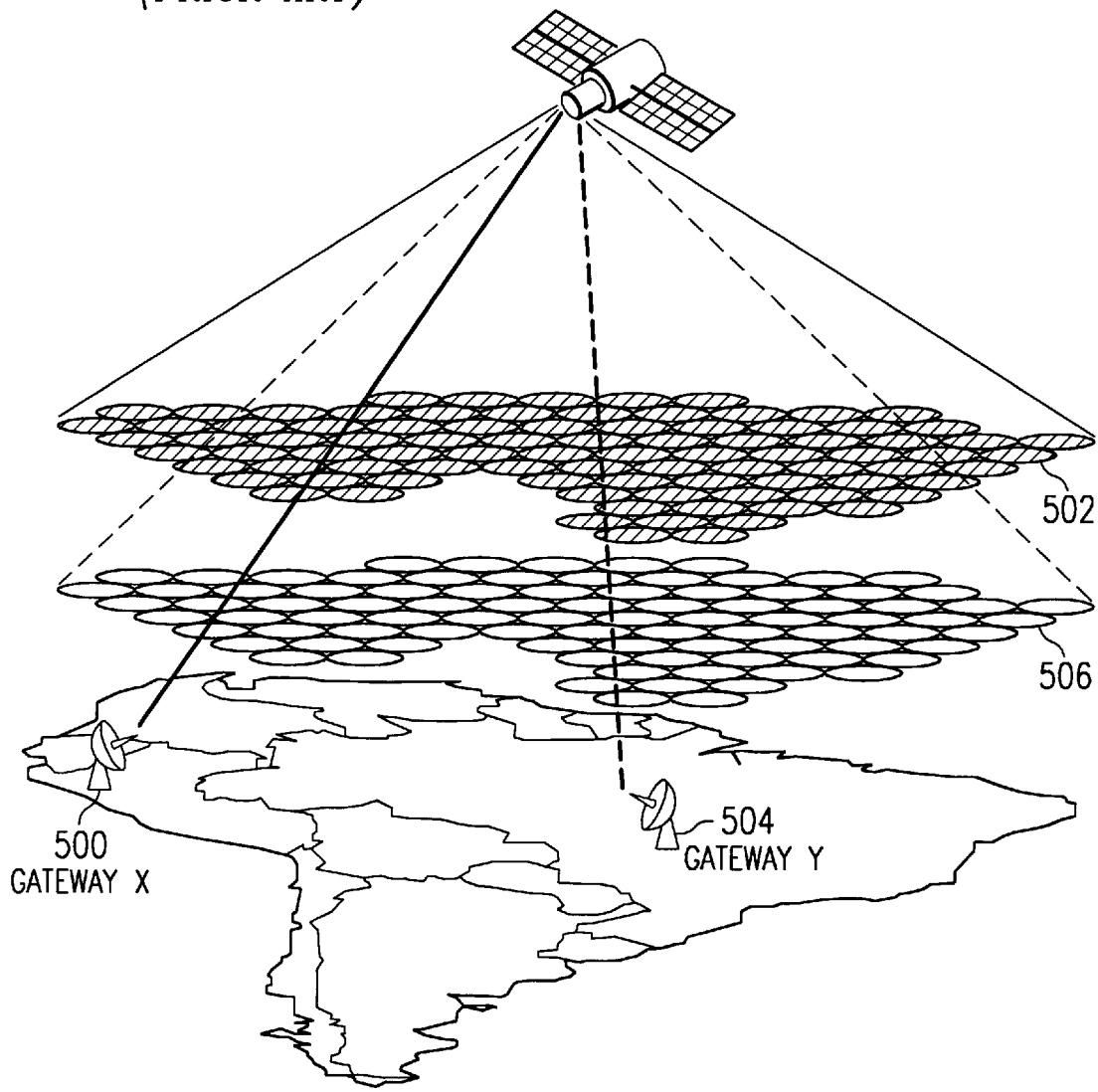
FIG. 5 shows a prior art beam coverage using the uniform multibeam beamforming system given in FIG. 4.

All the signals going to a feed group that generate one beam must be coherent and come from the same gateway. The current design, as illustrated in FIG. 5, has been that a gateway solely controls a group of frequency bands and evenly distributes them over the entire footprint. This does not fit the general traffic pattern and reduces the overall usable system capacity for a given spectrum. Thus, the present invention makes the signals going to a feed group piecewise coherent to form a beam that will be steered to a particular area on the earth that is controlled by that gateway's service area.

Other signals going to a feed group can be made piecewise coherent to form a different beam that will be steered to a different area (which can overlap another beams area) on the earth that is controlled by a different gateway's service area. In other words, allowing a local gateway to control local beams will not have the gateway distributing signals to all the feeds. Instead, a gateway will only send signals to the group of feeds involved in generating the beams that fall within the gateway's service area.

Figure 7:
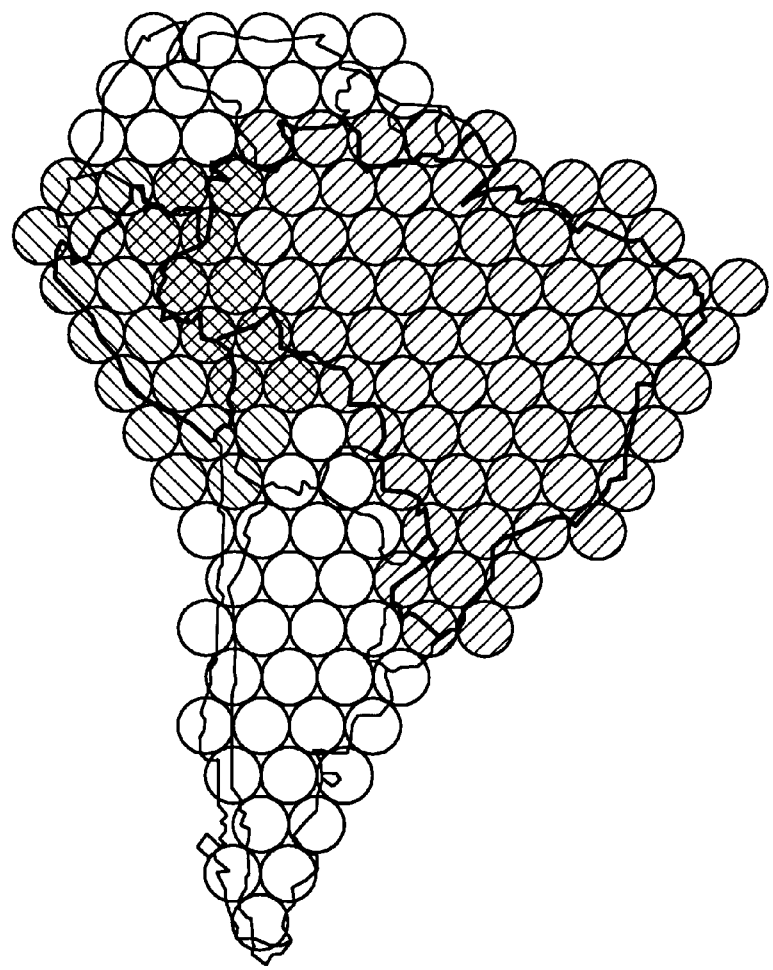
FIG. 7 illustrates the feed groups at the satellite antenna. Two feed groups with overlapped feeds at the boundary are controlled by two ground gateways.

FIG. 7 illustrates the feed array layout of the concept shown FIG. 6. The overall feed array is broken down into smaller segments. These segments can then cover different, selective regions.

FIG. 7 illustrates a view of the feed groups at the satellite antenna that are fed by multiple gateways. The feed arrangement usually has the rough shape of the service area to be covered. In this figure, all the feeds in the feed group $FG_X$ (700) are fed and controlled by gateway X (shown in FIG. 2). The feed signals are coherent and will form a set of beams as controlled by the phase and amplitude of the signals at the feeds.

Similarly, all the feeds in the feed group $FG_Y$ (702) are fed and controlled by gateway Y (shown in FIG. 2). The signals emitted from one feed group come from one gateway in a country and are coherent. The overlapping feeds (704) receive signals from both gateways in country X and in country Y.

Although the signals from different gateway stations may be of the same frequency, they are generally incoherent (thus essentially eliminates the effects of any possible interference). In this arrangement, the signals sent to the feeds are not all coherent, instead they are piece-wise coherent (coherent only within a group of beamforming feeds).

Figure 8A:
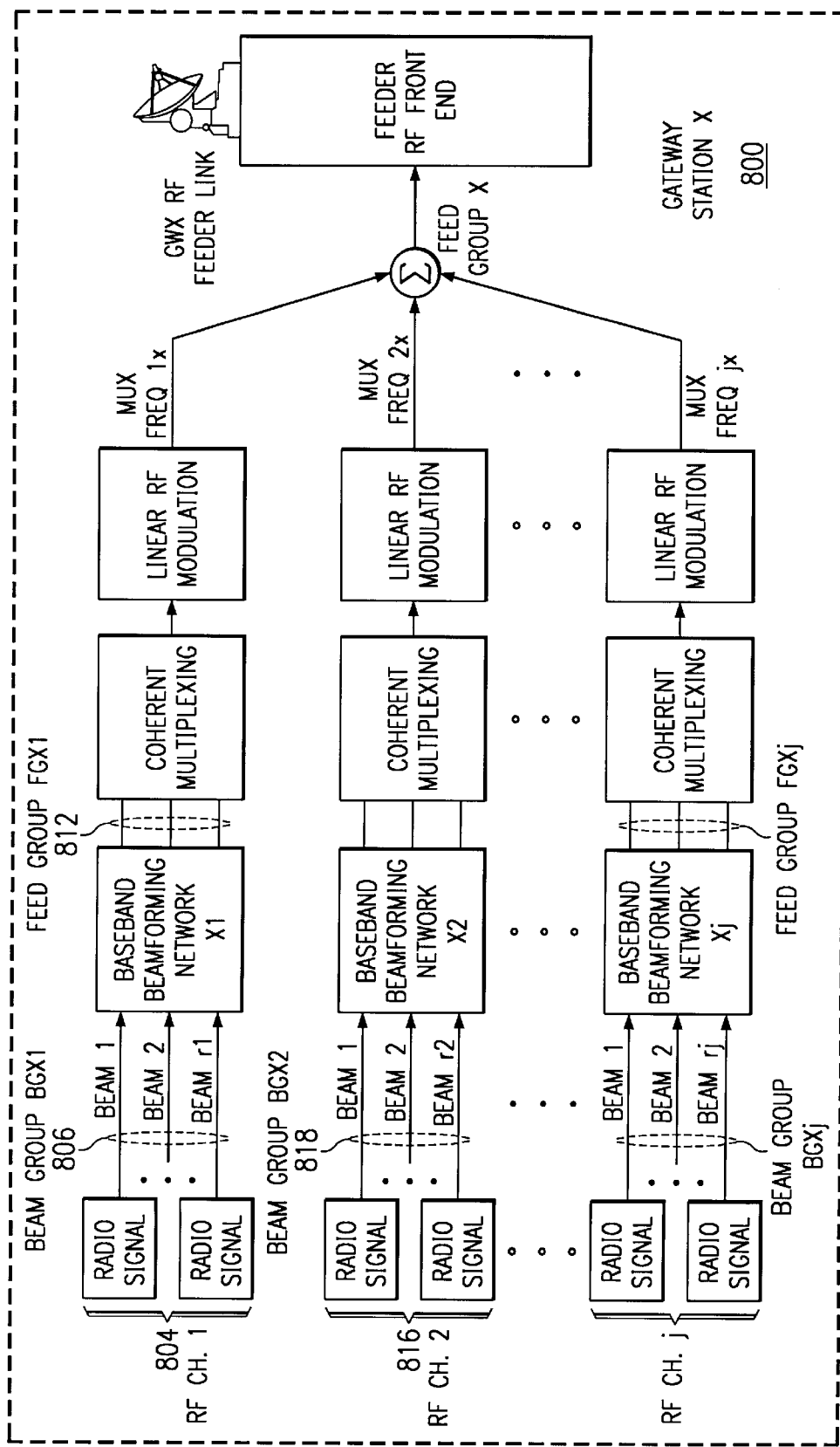
FIG. 8 is an illustration of two gateways controlling different beams and feed groups.
Figure 8B:
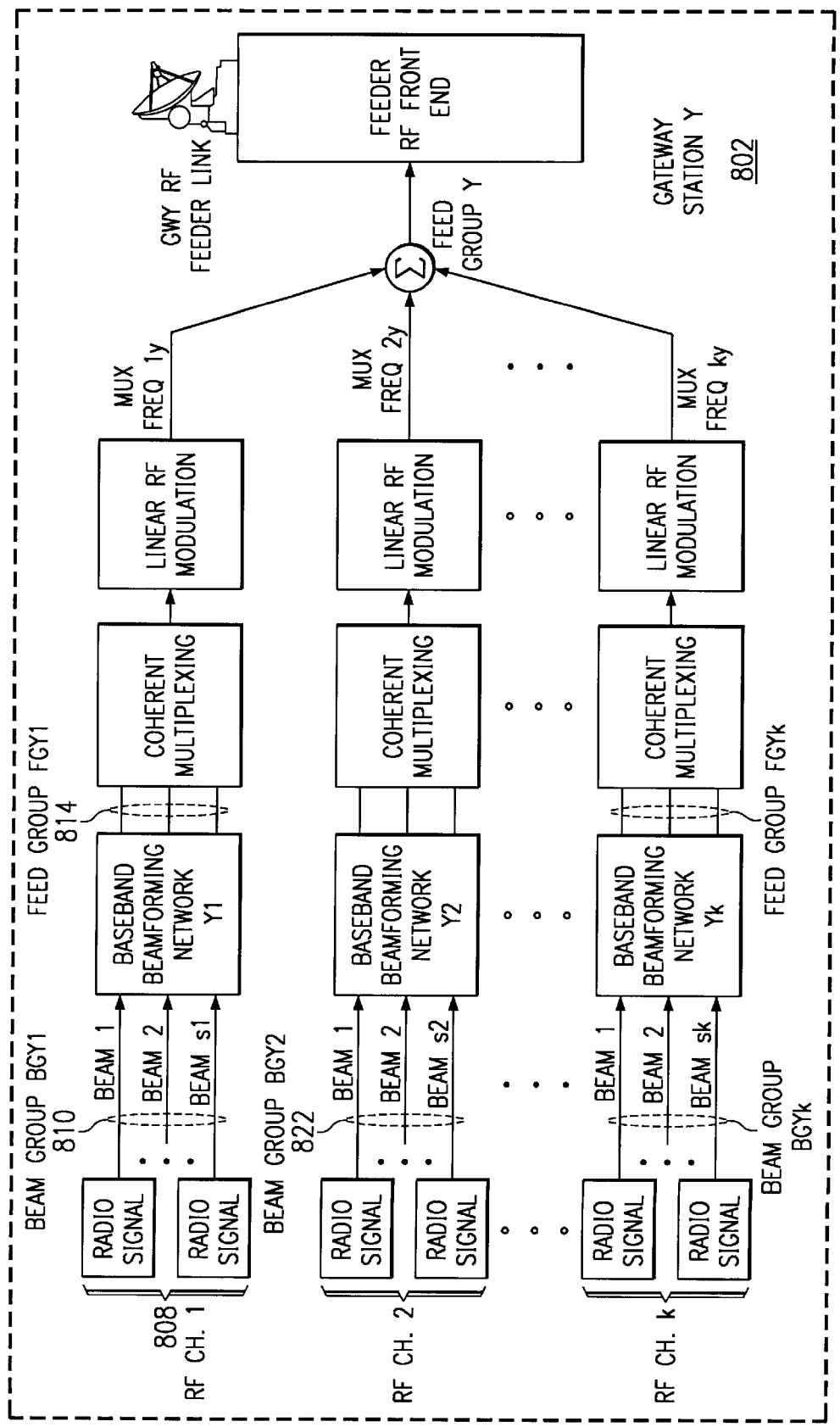

FIG. 8 shows the functional block diagram of the two gateways $GW_X$ (800) and $GW_Y$ (802). Each gateway (800 and 802) controls different beams and feed groups.

In $GW_X$ (800), for RF Channel 1 (804), $GW_X$ (800) controls all the beams in beam group $BG_{X1}$ (806). In $GW_Y$ (802), for RF Channel 1 (808), $GW_Y$ (802) controls all the beams in beam group $BG_{Y1}$ (808).

In general, the two beam groups of the same RF channel controlled by different gateways must be disjoint or must not overlap spatially. However, the feed group $FG_{X1}$ (812) and $FG_{Y1}$, (814) may overlap as described in FIG. 7. For a different RF channel, such as RF Channel 2 (816) in $GW_X$ (800), the distribution of beams between the gateways may be different.

For example, $BG_{X2}$ (818) does not have to equal $BG_{X1}$ (806). Additionally, in $GW_Y$ (802), $BG_{Y2}$ (822) does not have to equal to $BG_{Y1}$ (810). In other words, the distribution of beam and feeds to gateways is on a per RF channel basis. Different RF channels may have totally different distribution of beams and feeds to gateways.

The same principle applies to the reverse link at the gateway station based on the reciprocity theorem for the satellite antenna. The same satellite antenna used for transmission receives signals from the terminals in different beams. The signals illuminate the appropriate feeds at the defocused feed array according to which beam the signals come from (discussed in FIG. 6). The feed signals are coherently multiplexed and then converted to the feeder link carrier frequency to be transmitted back to the ground. The satellite transmits all the received feeder signals to all ground gateways under coverage without discrimination.

It is important that a linear modulation scheme is used for feeder links from the ground gateways to the satellite. In linear modulation techniques, the amplitude of the transmitted signal varies linearly with the modulating digital signal.

The present system relies on the fact that signals from multiple gateways transmitting to the satellite antenna feeds can superimpose on each other (e.g., the feeds fed by multiple gateways) so that the linear superposition principle applies. A linear modulation scheme allows signals from multiple gateways to superimpose linearly on the satellite antenna feeds.

The gateway receiver performs almost the same functionality in a reverse direction as shown in FIG. 8. It is redrawn in FIG. 9 for easier reference.

Figure 9:
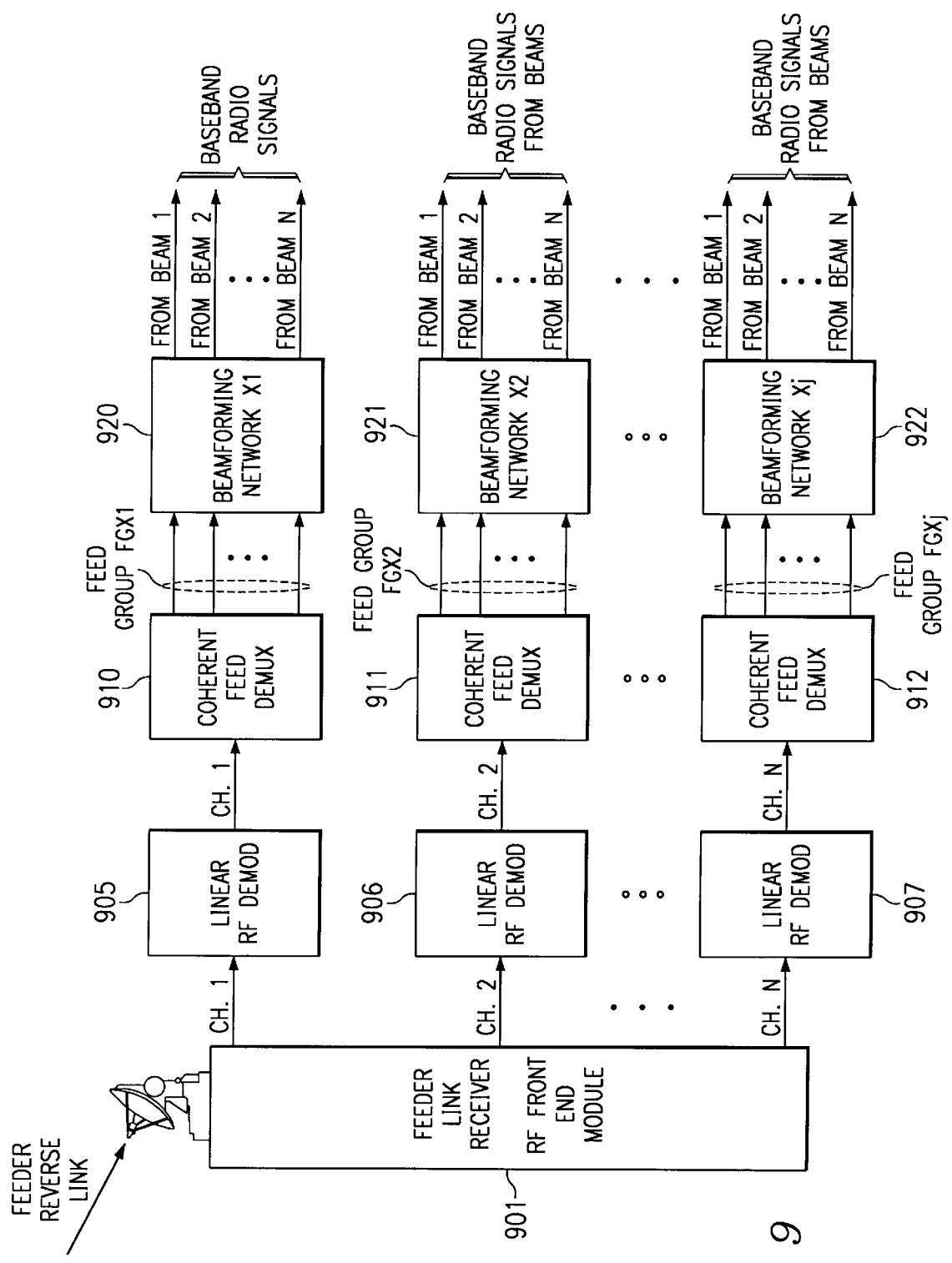
FIG. 9 shows a block diagram for the reverse link of the piece-wise coherent beamforming at a ground gateway.

In FIG. 9, the front end RF module (901) distributes different RF channels to the corresponding linear demodulator (905–907) and then to coherent demultiplexers (910–912) where the signals from different feeds are separated. The receiving gateway has the knowledge on which frequency channels and feed groups it is controlling. It applies the appropriate baseband beamforming network (920–922) to selected feed signals.

The feed signals of the same frequency may come from different beams due to the feed group overlapping. However, only the coherent signals could contribute to the output through the beamforming network. It is important, therefore, that the coherence of signals from the feeds is maintained from the satellite multiplexing, transmission, and ground demultiplexing.

The present invention allows the total freedom of allocating beams to gateways with the only constraint that no single beam at any one frequency is allocated to more than one gateway. It is obvious that the invention allows the most flexibility in matching the beam resources (traffic carrying capacity) to the traffic demand within the constraints of the satellite power and RF channel availability.

Figure 10:
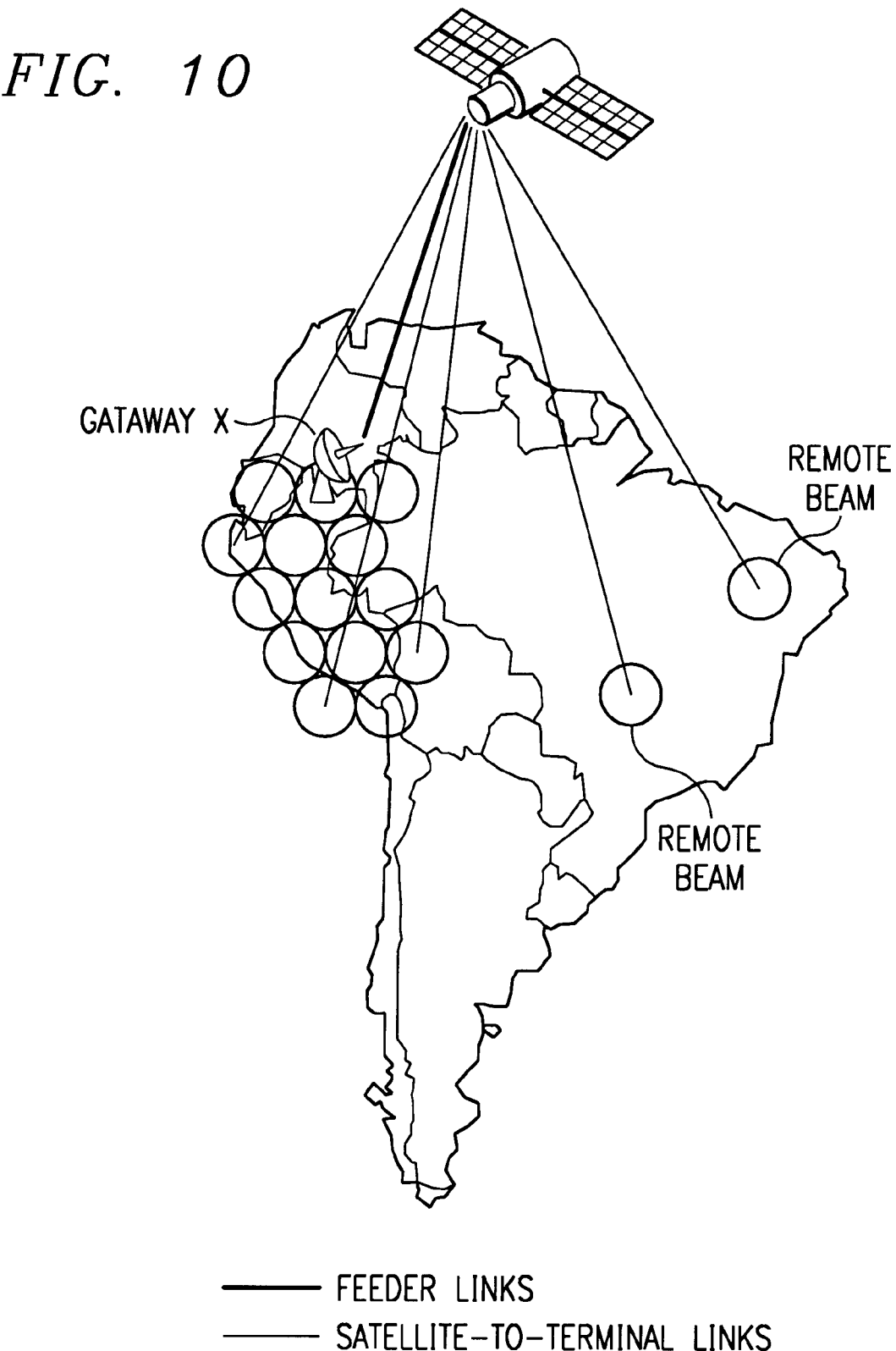
FIG. 10 gives an example on how a terminal in a remote area can be connected to a gateway using designated remote beams.

Since not all the traffic is confined to local regions, FIG. 10 illustrates an example of how a terminal in a remote area can be connected to a gateway using designated remote beams. The remote beams can be pointed anywhere provided that the beam and its carrier frequency are not already used by another gateway. In the situation of a large country, multiple gateways are needed even for the domestic coverage. Although most traffic follows the above-described general traffic pattern, there are needs to link distant regions. This example illustrates a way to control local and distant region communications traffic.

The preferred embodiment of the present invention uses a regular beam pattern on a fixed grid. If digital beamforming is used in ground gateways that have total flexibility on the coefficients of the beamforming matrix (Xi and Yi in FIG. 8), the beams do not have to lie on a regular grid pattern. However, co-channel beams (beams in the same RF channel) must be separated by a certain distance depending on the multi-beam antenna design, to provide enough isolation between co-channel beams. As long as the co-channel isolation requirement is satisfied, the same constraint applies in that no single beam at any one frequency is allocated to two gateways.

The preferred embodiment of the present invention refers to two gateways. Alternate embodiments use three or more gateways. The only constrain is that each RF channel, the groups of beams allocated to different gateways, must be mutually disjoint. In other words, overlapping of any beam between ay two gateways at any RF channel is not allowed.

The piecewise coherent beamforming system of the present invention provides many benefits over the prior art. The present invention allows for flexible allocation of beams to controlling gateways. For any RF channel frequency, control and forming of the beams can be allocated to any gateway.

Another benefit is the allocation of beams to gateway on a per RF channel basis. The allocation at one RF channel is totally independent of other RF channels. Also, the present invention improves overall communication capacity for a given RF spectrum since the new beams to gateway assignment flexibility allows better fit of beam capacity to the traffic pattern of the regional satellite communications. The present invention additionally enables connectivity of communications to any boundary within the system footprint.

In view of the above detailed description and associated drawings, the advantages of this method and apparatus for processing multiple types of incoming wireless and wireline communications should be apparent to those skilled in the art. Additionally, modifications and variations will now become apparent to those skilled in the art such that other modifications and variations may be effected without departing from the spirit and scope of the present invention as set forth in the claims which follow.

We claim:

1. A satellite communications system comprising:
  a satellite comprising:
    a substantially parabolic antenna having a focal plane, the antenna having the ability to provide a footprint over a predetermined surface area; and
    a plurality of antenna feeds arranged in an array offset from the focal plane such that a first group of feeds, of the plurality of antenna feeds, provides a footprint only over a predetermined region that is a subset of the predetermined surface area, all signals from the first group of feeds being coherent with other signals in the first group of feeds and incoherent with signals in other groups of feeds of the plurality of antenna feeds;
  a plurality of regional, ground-based gateway stations, each gateway station operating in substantially the same frequency spectrum, each gateway station operating in a different predetermined region that the other gateway stations, each gateway station having means for controlling coherent signals that are transmitted to the plurality of antenna feeds; and
  a plurality of user terminals, coupled to the ground-based gateway stations over a radio frequency link.

2. The system of claim 1 wherein each regional, ground-based gateway station has a beamforming network that is controllable to produce feed group signals based on a capacity of a nearby region.

3. A ground-based, satellite gateway station, the gateway station being part of a plurality of ground-based, satellite gateway stations, each gateway station located in a different region and operating in the same frequency spectrum as the other gateway stations, each gateway station sending signals to earth orbiting satellite having antenna feeds, the ground-based, satellite gateway station comprising:
  a plurality of groups of radio signals, each radio signal in a first group operating on the same frequency as other radio signals within the first group and being coherent with other signals within the first group, each group of the plurality of groups of radio signals operating on a different frequency than and being incoherent with other groups of the plurality of groups of radio signals;
  a plurality of baseband beamforming networks, each network coupled to a different group of the plurality of groups of radio signals, each beamforming network generating a different group of feed signals to be radiated at the satellite antenna feeds;
  a plurality of coherent multiplexers, each multiplexer coupled to a different baseband beamforming network, for combining the group of feed signals from each beamforming network into a single baseband signal;
  a plurality of linear radio frequency modulators, each modulator coupled to a coherent multiplexer, each modulator generating a radio frequency modulated signal from each of the baseband signals; and
  an antenna, coupled to the plurality of linear radio frequency modulators, for transmitting the radio frequency modulated signals to a satellite.

4. The satellite communications system of claim 3 and further including a plurality of trunking lines for coupling a plurality of regional ground-based satellite gateway stations.

5. The satellite communications system of claim 4 and further including a plurality of user terminals coupled to each regional ground-based satellite gateway station over a radio frequency link.

6. The satellite communication system of claim 3 wherein the satellite further comprises a defocused feed array for illuminating only a predetermined region.

* * * * *